W. STRANDERS.
EDUCATIONAL APPARATUS.
APPLICATION FILED MAY 2, 1921.

1,428,456.　　　　　　　　　　　　Patented Sept. 5, 1922.

Inventor
Walter Stranders
by Wilkinson & Giusta
Attorneys.

Patented Sept. 5, 1922.

1,428,456

UNITED STATES PATENT OFFICE.

WALTER STRANDERS, OF LONDON, ENGLAND.

EDUCATIONAL APPARATUS.

Application filed May 2, 1921. Serial No. 466,191.

*To all whom it may concern:*

Be it known that I, WALTER STRANDERS, a subject of the King of England, residing at London, in England, have invented certain new and useful Improvements in Educational Apparatus, of which the following is a specification.

This invention consists in improvements in or relating to educational apparatus particularly in the kindergarten for teaching spelling.

According to this invention, apparatus for teaching spelling comprises the combination with a series of separate letters, each having a strip of distinctive colour, of key-elements, which may be for example, either object pictures or word bars, each having at one edge, in the correct order, strips of colour corresponding with the colours on the letters required to make up a particular word or the name of the object in the picture.

The accompanying drawing illustrates, by way of example, in—

Figure 1:
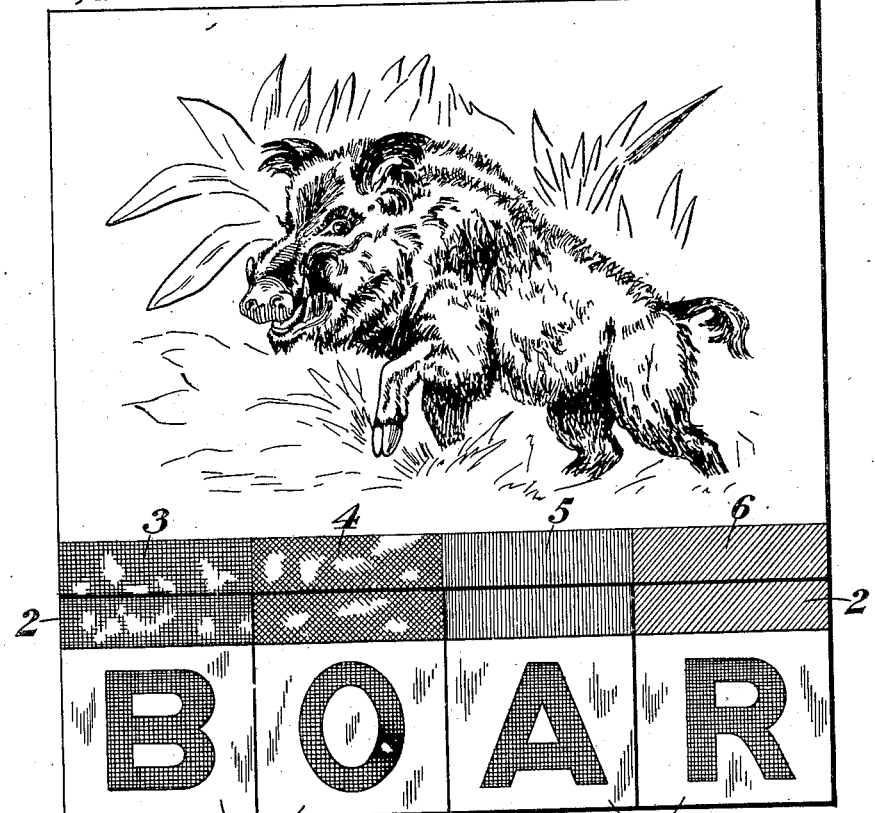

Figure 1 a picture: and in

Figure 2:
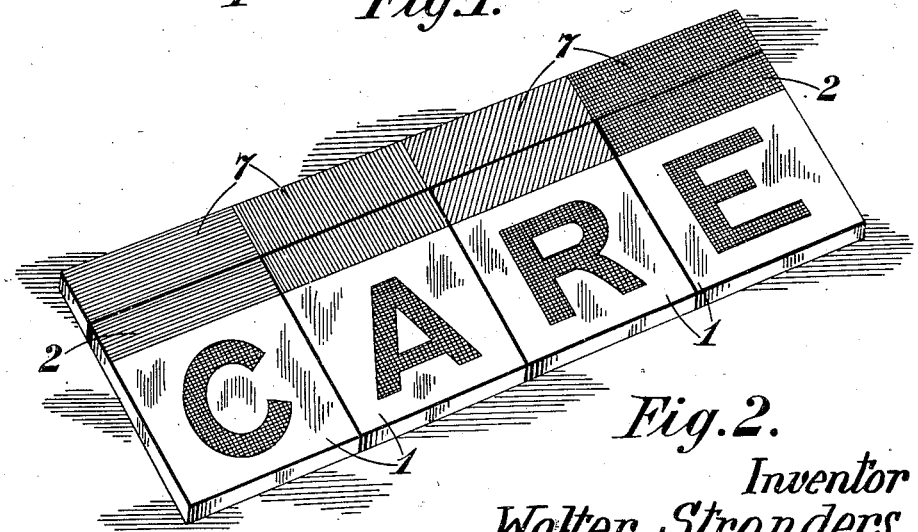

Figure 2 a word-bar, with the corresponding letters laid in place adjacent thereto.

A box of appliances for teaching spelling, according to this invention, may comprise, for example, six letters, each printed in bold block type on paper secured to the surface of a rectangular straw-board or wooden plate, such as 1 Figure 2. Upon this plate carrying a single letter is a strip 2 of distinctive colour extending along the top of the plate above the letter. Each letter in the set has an appropriate colour allotted to it, for example, the letters and appropriate colours may be:—

A, red; B, yellow; C, blue; E, black; O, orange; R, purple.

The box also contains one or preferably a number of pictures such as the one illustrated in Figure 1, each printed on a sheet of paper secured on a backing of straw-board or wood. At one edge of the picture, preferably the lower edge, there is a series of strips of colour 3, 4, 5, 6, each strip of the same length as the strips of colour on the wooden plates carrying the letters. These strips of colour are arranged in order, corresponding with the colours over the letters which make up the name of the object in the picture.

Thus in Figure 1 the strips of colour 3, 4, 5, 6 are respectively, yellow, orange, red and purple, and the letters which have these colours on their upper edge when arranged so that their colours match against the picture, spell the word BOAR.

In Figure 2, there is illustrated a word-bar 7, which is provided with a series of strips of colour to be matched with suitable letters similarly to the strips 3, 4, 5, 6 on Figure 1.

The box of appliances preferably contains a number of pictures and word-bars so chosen that a considerable number of words can be built up by matching the colours out of the simple assortment of letters supplied.

The method of using the apparatus may vary considerably according to the wishes of the teacher or the fancy of the child, but broadly speaking, the child has only to match the colours of the letters to the colours under the pictures, and then the name of the article is set out under the picture. Thus the child finds that it has put the word together, and so learns to spell.

The features of construction of the appliances may be varied without departing from this invention. Thus the separate characters may be in any type or script, and the letters, pictures and coloured strips may be printed, impressed, cut or otherwise shown on cardboard, metal or wood (covered with paper or not). Obviously, the characters employed may be such as to spell words in any language and need not be alphabetical. For example, some of them may be numerical characters.

Wooden blocks may be used for the letters. In the case of wooden plates both sides may be used or in the case of cubical blocks each of the six sides may be used to exhibit, for example, one letter and a corresponding strip of colour. Also, it will be evident that the number of pictures, word-bars or letters chosen may be any desired.

What I claim as my invention and desire to secure by Letters Patent is:—

1. In educational apparatus the combination of a plurality of separate letter-elements each bearing an area of distinctive colour and a key-element bearing a series of distinctively coloured areas in an order such that the letter-elements when matched therewith by their coloured areas are arranged as desired.

2. In educational apparatus the combination of a plurality of separate letter-elements each bearing an area of distinctive colour and an object picture bearing a series of distinctively coloured areas in an order such that the letter-elements when matched therewith by their coloured areas are arranged as desired.

3. In educational apparatus the combination of a plurality of separate plates each bearing an alphabetical letter and an area of distinctive colour, and a key-element bearing a series of distinctively coloured areas in an order such that the letter elements when matched therewith by their coloured areas are arranged as desired.

4. In educational apparatus the combination of a plurality of separate plates each bearing a character and an area of distinctive colour along one edge of the plate, and a key-element bearing a series of strips of distinctive colour along one edge in such position that the colours on the plates can be laid adjacent thereto for matching, for the purpose described.

5. In educational apparatus the combination of a plurality of separate plates each bearing an alphabetical letter and a strip of distinctive colour along the upper edge, and an object picture bearing a series of strips of colour along the lower edge in an order such that the plates when matched therewith by the coloured strips are arranged as desired.

In testimony whereof I have signed my name to this specification.

WALTER STRANDERS.